(12) United States Patent
Isard et al.

(10) Patent No.: US 8,332,862 B2
(45) Date of Patent: Dec. 11, 2012

(54) SCHEDULING READY TASKS BY GENERATING NETWORK FLOW GRAPH USING INFORMATION RECEIVE FROM ROOT TASK HAVING AFFINITIES BETWEEN READY TASK AND COMPUTERS FOR EXECUTION

(75) Inventors: Michael Isard, San Francisco, CA (US); Vijayan Prabhakaran, Sunnyvale, CA (US); Jonathan James Currey, San Francisco, CA (US); Ehud Wieder, Sunnyvale, CA (US); Kunal Talwar, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 655 days.

(21) Appl. No.: 12/560,452

(22) Filed: Sep. 16, 2009

(65) Prior Publication Data

US 2011/0067030 A1 Mar. 17, 2011

(51) Int. Cl.
*G06F 9/46* (2006.01)
*G06F 15/16* (2006.01)
*G06F 15/173* (2006.01)

(52) U.S. Cl. ........ 718/104; 718/105; 718/102; 718/100; 709/202; 709/201; 709/223

(58) Field of Classification Search ......................... None
See application file for complete search history.

(56) References Cited

U.S. PATENT DOCUMENTS

| | | | |
|---|---|---|---|
| 5,602,754 A * | 2/1997 | Beatty et al. | 716/108 |
| 5,642,508 A * | 6/1997 | Miyazawa | 718/104 |
| 7,444,510 B2 | 10/2008 | Venkatachary et al. | |
| 7,464,380 B1 | 12/2008 | Hempel | |
| 7,490,325 B2 | 2/2009 | Jackson | |
| 2003/0177166 A1* | 9/2003 | Robertazzi et al. | 709/105 |
| 2004/0244003 A1 | 12/2004 | Perfetto et al. | |
| 2006/0010449 A1 | 1/2006 | Flower et al. | |
| 2009/0138312 A1 | 5/2009 | Moll et al. | |
| 2009/0182814 A1* | 7/2009 | Tapolcai et al. | 709/205 |

OTHER PUBLICATIONS

Virginia Mary Lo; Heuristic Algorithms for Task Assignment in Distributed Systems, IEEE Transactions on Computers, vol. 37, No. 11, Nov. 1988.*

(Continued)

*Primary Examiner* — Meng An
*Assistant Examiner* — Bing Zhao
(74) *Attorney, Agent, or Firm* — Microsoft Corporation

(57) ABSTRACT

A job scheduler may schedule concurrent distributed jobs in a computer cluster by assigning tasks from the running jobs to compute nodes while balancing fairness with efficiency. Determining which tasks to assign to the compute nodes may be performed using a network flow graph. The weights on at least some of the edges of the graph encode data locality, and the capacities provide constraints that ensure fairness. A min-cost flow technique may be used to perform an assignment of the tasks represented by the network flow graph. Thus, online task scheduling with locality may be mapped onto a network flow graph, which in turn may be used to determine a scheduling assignment using min-cost flow techniques. The costs may encode data locality, fairness, and starvation-freedom.

10 Claims, 7 Drawing Sheets

OTHER PUBLICATIONS

Mohring et al; Solving Project Scheduling Problems by Minimum Cut Computations, Management Science, vol. 49, No. 3, Mar. 2003.*

Yu, et al., "DryadLINQ: A System for General-Purpose Distributed Data-Parallel Computing Using a High-Level Language", Retrieved at <<research.microsoft.com/en-us/projects/dryadlinq/dryadlinq.pdf>>, Proceedings of the 8th USENIX Symposium on Operating Systems Design and Implementation, Dec. 8-10, 2008, pp. 1-14.

Bergamaschi, et al., "Control-Flow versus Data-Flow-Based Scheduling: Combining Both Approaches in an Adaptive Scheduling System", Retrieved at <<ieeexplore.ieee.org/stamp/stamp.jsp?tp=&arnumber=555989&isnumber=12118>>, IEEE Transactions on Very Large Scale Integration (VLSI) Systems, vol. 5, No. 1, Mar. 1997, pp. 82-100.

"United Devices", Retrieved at <<techguideonline.com/gridcluster/datasheet.php?ds=33>>, Jul. 20, 2009, p. 1.

Reddy, et al., "Optimizing Grid Scheduling Based on Local Cluster Scheduling Policies and Resource Availability", Retrieved at <<ww1.ucmss.com/books/LFS/CSREA2006/GCA4611.pdf>>, Proceedings of the 2006 International Conference on Grid Computing & Applications, Jun. 26-29, 2006, pp. 7.

"Minimum Cost Flow Problem", Retrieved at <<en.wikipedia.org/wiki/Min_cost_flow>>, Jul. 20, 2009, pp. 1-2.

* cited by examiner

SCHEDULING READY TASKS BY GENERATING NETWORK FLOW GRAPH USING INFORMATION RECEIVE FROM ROOT TASK HAVING AFFINITIES BETWEEN READY TASK AND COMPUTERS FOR EXECUTION

BACKGROUND

Data intensive cluster computing is increasingly used for a large number of applications including webscale data mining, machine learning, and network traffic analysis. Jobs may be scheduled to execute concurrently on a shared computing cluster in which application data is stored on the compute nodes. Scheduling computations close to their data is crucial for performance.

A scheduler assigns tasks from the running jobs to compute nodes in a computer cluster. Schedulers for clusters are typically optimized for throughput and offer poor fairness guarantees, wherein fairness ensures that each job gets a fair share of the cluster resources. Thus, a job that uses very few resources may take a long time to complete if it is assigned behind other long running jobs.

SUMMARY

A job scheduler may schedule concurrent distributed jobs in a computer cluster by assigning tasks from the running jobs to compute nodes while balancing fairness (ensuring that each job gets a fair share of the cluster resources) with efficiency (ensuring that tasks run in locations that are close in network topology to their data). In an implementation, the job scheduler may stop or kill running jobs.

In an implementation, determining which tasks to assign to the compute nodes may be performed using a network flow graph. An instantaneous task assignment problem may be represented using a network flow graph. The weights on at least some of the edges of the graph encode data locality, and the capacities provide constraints that ensure fairness.

In an implementation, a min-cost flow technique may be used to perform an assignment of the tasks represented by the network flow graph. Thus, online task scheduling with locality may be mapped onto a network flow graph, which in turn may be used to determine a scheduling assignment using min-cost flow techniques. In an implementation, the costs encode the data locality, fairness, and starvation-freedom.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
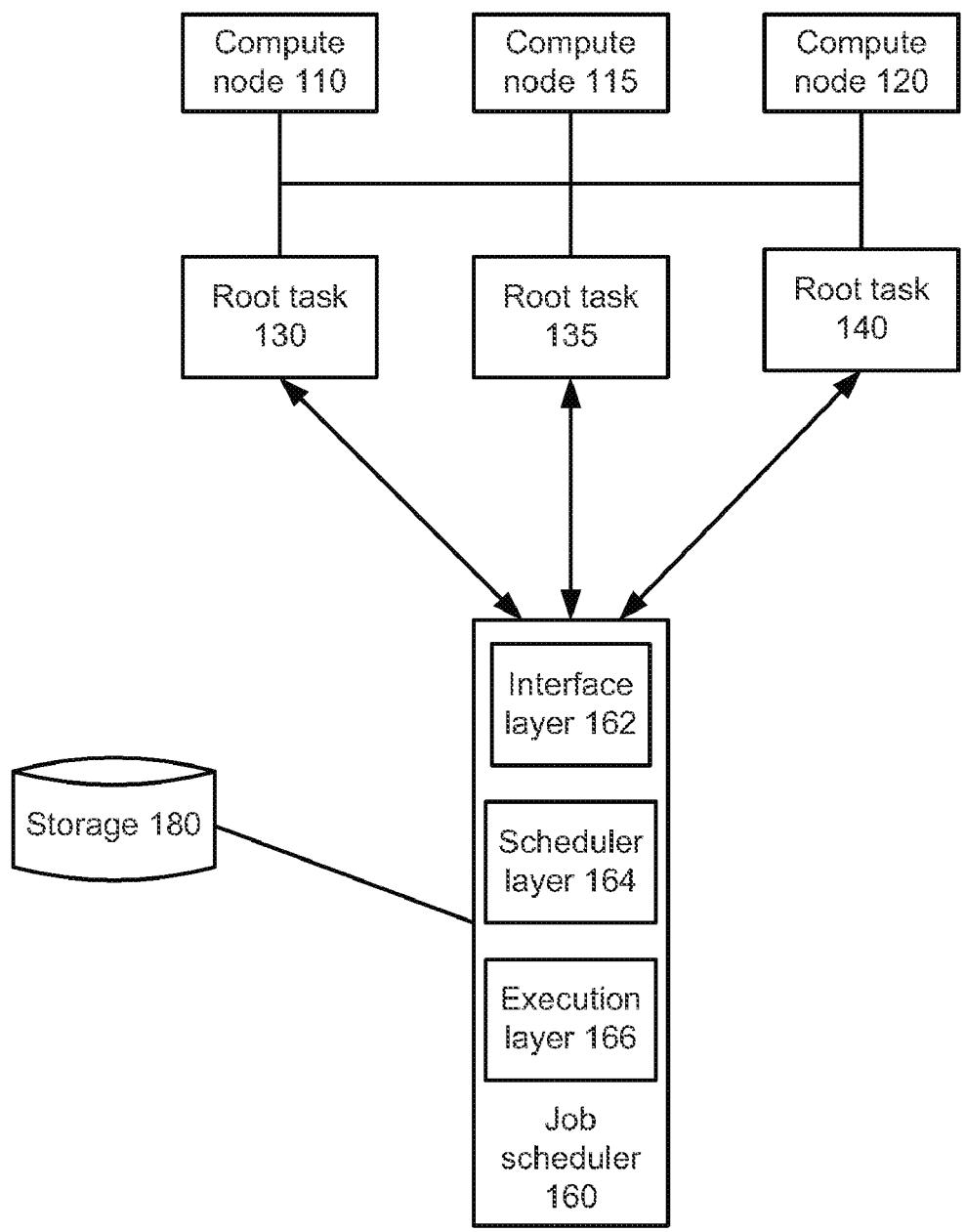
FIG. 1 illustrates an exemplary cluster scheduling environment.

FIG. 1 illustrates an exemplary cluster scheduling environment 100. A computer cluster is a top level organizational unit comprising a group of linked computers that act together to perform a function. The components of a cluster are typically connected to each other through fast local area networks. Clusters are usually deployed to improve performance and/or availability over that provided by a single computer, while typically being more cost effective than single computers of comparable speed or availability. An application connected to a computer cluster appears to an end user to be connected to one system.

The cluster scheduling environment 100 includes compute nodes 110, 115, 120 and root tasks 130, 135, 140. Each compute node may comprise a single computer with one or more processors and may run one or more applications. Each compute node may have one or more large disks directly attached to them, allowing application data to be stored on the same computer(s) on which it will be processed. An example compute node and its components are described in more detail with respect to FIG. 7. Although only three compute nodes 110, 115, 120 and three root tasks 130, 135, 140 are shown in FIG. 1, the description is not so limited, and any number of compute nodes and root tasks may be used in conjunction with the techniques, systems, and operations described herein.

Since most clusters have hierarchical networks with different data transfer costs between different pairs of compute nodes, an efficient execution strategy may place each computation as close in network topology to its inputs as possible. Data sources such as storage 180 may be accessible from each of the compute nodes 110, 115, 120.

A task represents the execution of a single process or multiple processes on a compute node. A collection of tasks that is used to perform a computation is referred to as a job. Jobs are used to reserve the resources that are used by tasks. A job can specify a list of compute nodes on which it can be run.

A job is submitted to one of the root tasks 130, 135, 140, which provides information regarding the job to a job scheduler 160 (which may act as a head node). The job scheduler 160 (an implementation of which is described further with respect to FIG. 3) controls resource allocation, job execution, and recovery on failure. The job scheduler 160 interfaces with the root tasks 130, 135, 140 through an interface layer 162. The job scheduler 160 comprises a scheduler layer 164 that provides job scheduler service. The job scheduler 160 also comprises an execution layer 166 that manages the compute nodes 110, 115, 120 via the root tasks 130, 135, 140. The job scheduler 160 may be called when a compute node starts or a task is finished on a compute node.

The job scheduler 160 is in communication with the root tasks 130, 135, 140 and storage 180. The job scheduler 160 and the root tasks 130, 135, 140 may be implemented in one or more computing devices, such as a computer device described with respect to FIG. 7, for example. A network, such as for example, the Internet, a wide area network (WAN) or local area network (LAN), connects the compute nodes 110, 115, 120, the root tasks 130, 135, 140, the job scheduler 160, and the storage 180. The storage 180 may comprise a queue, which is an organizational unit that contains queued, running, and finished jobs. Finished jobs may be removed from the queue.

In the cluster scheduling environment 100, multiple jobs may be executed concurrently. Each task may read data that is stored on one or more of the compute nodes 110, 115, 120, so executing a given task on one compute node (e.g., close to its input data) may be more efficient than executing on another compute node (e.g., which is far in network topology from the data).

The job scheduler 160 may schedule concurrent distributed jobs by assigning tasks from the running jobs to the compute nodes 110, 115, 120 while balancing fairness (ensuring that each job gets a fair share of the cluster resources) with efficiency (ensuring that tasks run in locations that are close in network topology to their data). In an implementation, the job scheduler 160 may stop or kill running jobs. Determining which tasks to assign to the compute nodes 110, 115, 120 may be performed using a network flow graph as described further herein. In particular, an instantaneous task assignment problem may be represented using a network flow graph. The weights on at least some of the edges of the graph encode data locality or other constraints, and the capacities provide constraints that ensure fairness. A min-cost flow technique may be used to perform an assignment of the tasks represented by the network flow graph. Thus, online task scheduling with locality may be mapped onto a network flow graph, which in turn may be used to determine a scheduling assignment using known min-cost flow techniques. In an implementation, the costs encode the data locality, fairness, and starvation-freedom.

Figure 2:
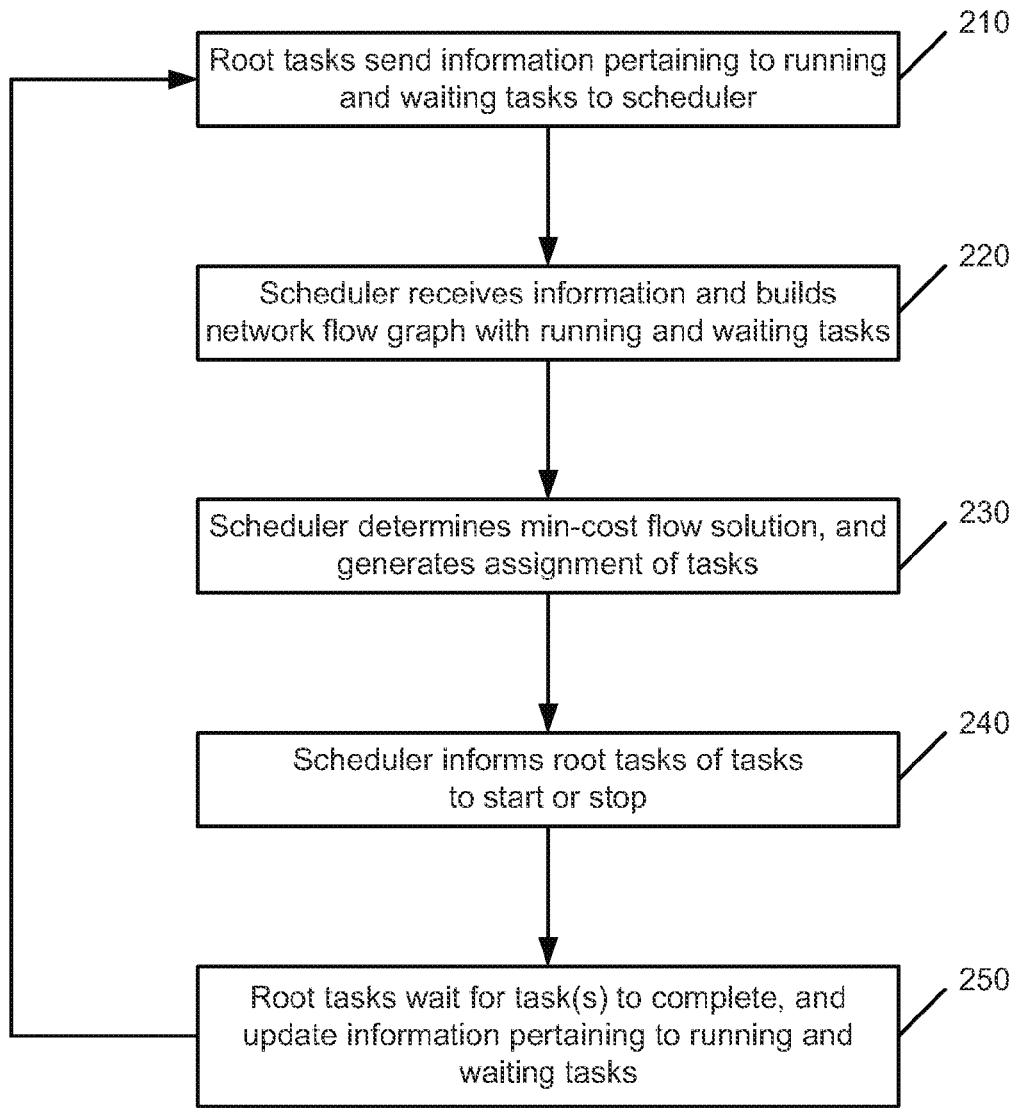
FIG. 2 is an operational flow of an implementation of a method of scheduling.
Figure 3:
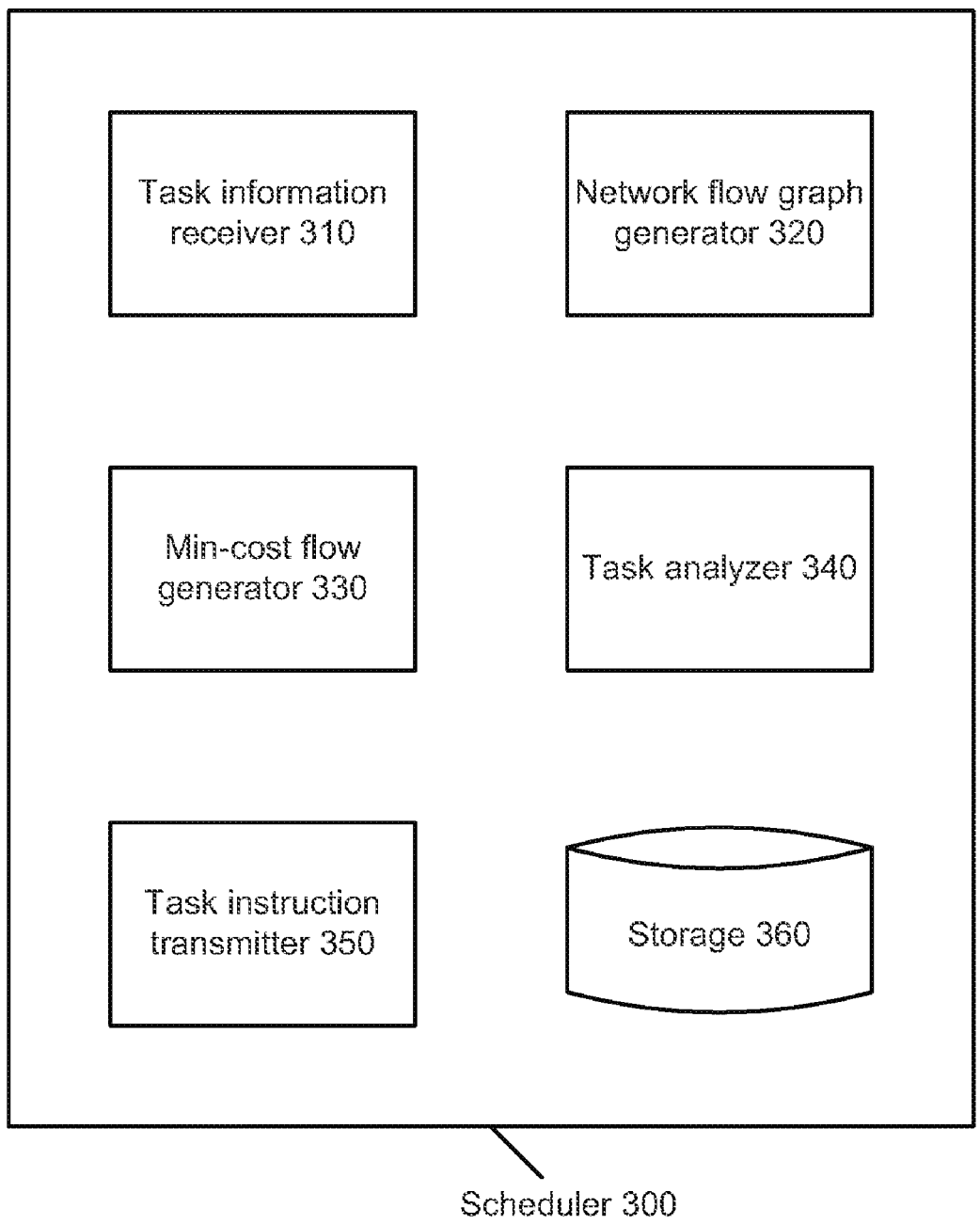
FIG. 3 is a block diagram of an implementation of a system that may be used for scheduling.

FIG. 2 is an operational flow of an implementation of a method 200 of scheduling, and FIG. 3 is a block diagram of an implementation of a scheduler 300 that may be used for scheduling. In an implementation, multiple root tasks, such as root tasks 130, 135, 140, may be running, with each root task responsible for a set of tasks to run. At 210, each root task may send the scheduler 300 information pertaining to the tasks the root task would like to run (i.e., waiting tasks) as well as those tasks that are currently running (i.e., running tasks). The information may take the form of a list, for example. In an implementation, the job scheduler 160 may comprise the scheduler 300, for example.

The scheduler 300 may comprise a task information receiver 310 which may receive the information pertaining to the running tasks and waiting tasks from the root tasks 130, 135, 140. At 220, the scheduler 300 receives the information and a network flow graph generator 320 of the scheduler 300 may build a network flow graph comprising the running tasks and the waiting tasks using the active jobs.

At 230, a min-cost flow generator 330 of the scheduler 300 may determine a min-cost flow solution of the network flow graph that was generated at 220. The solution may be analyzed by a task analyzer 340 of the scheduler 300 to generate an assignment of tasks to particular computers (e.g., such as the compute nodes 110, 115, 120), as described further herein. It may be considered that there is a quantifiable cost to every scheduling decision. For example, there is a data transfer cost incurred by running a task on a particular compute node, and there is a cost in wasted time to stopping a task that has been executing, which may be encoded in a weight on a graph edge. As these costs may be expressed in the same units (e.g., "copying 1 GB of data across a rack's local switch costs the same as killing a vertex that has been executing for 100 seconds"), a technique can be used to minimize the total cost of the scheduling assignments. A min-cost flow technique can be used, or any other type of low-cost flow technique can be used.

More particularly, in an implementation, an instantaneous scheduling problem may be represented using a flow network. A flow network is a directed graph, each of whose edges e is annotated with a non-negative integer capacity $c_e$ and a cost $p_e$, and each of whose nodes n is annotated with an integer "excess" $\epsilon_n$ where $\Sigma_n \epsilon_n$. A "feasible flow" assigns a non-negative integer flow $f_e \leq c_e$ to each edge such that, for every node n, $$\epsilon_n + \sum_{e \in I_n} f_e = \sum_{e \in O_n} f_e$$

where $I_n$ is the set of incoming edges to n and $O_n$ is the set of outgoing edges from n. In a feasible flow, $$\epsilon_n + \sum_{e \in I_n} f_e$$

is referred to as the flow through node n. A min-cost feasible flow is a feasible flow that minimizes $\Sigma_e f_e \rho_e$.

A minimum flow $d_e \leq c_e$ for an edge e from node a to node b may be specified without altering the other costs or capacities in the graph. This may be achieved by setting node a's excess to $\epsilon_a - d_e$, node b's excess to $\epsilon_b + d_e$, and node e's capacity to $c_e - d_e$. Additionally, known worst-case complexity bounds on a min-cost flow problem are E log (V)(E+V log (V)), where E is the number of edges and V is the number of nodes, and V E log (V C) log ($V^2$/E), where C is the largest absolute value of an edge cost.

At 240, a task instruction transmitter 350 of the scheduler 300 may inform the root tasks to start or stop running tasks on the computers by providing instructions to the root tasks. The instructions may identify the tasks as well as the compute node that is to run each task. Additionally, the instructions may identify the tasks to stop running (i.e., "kill") on the compute nodes.

At 250, each time a task completes (which may cause other tasks to be ready to run), the root task which is responsible for that task updates its list of running tasks. When a root task has a new list of tasks to run, or a task completes, processing may continue at 210 and the root task informs the scheduler 300 again, and a new assignment of tasks may be determined pursuant to the generation of a revised network flow graph and a solution to the revised network flow graph.

The scheduler 300 may comprise storage 360 that may store information pertaining to running, finished, and killed jobs and/or tasks, for example. In an implementation, the storage 180 may comprise the storage 360, for example.

Figure 4:
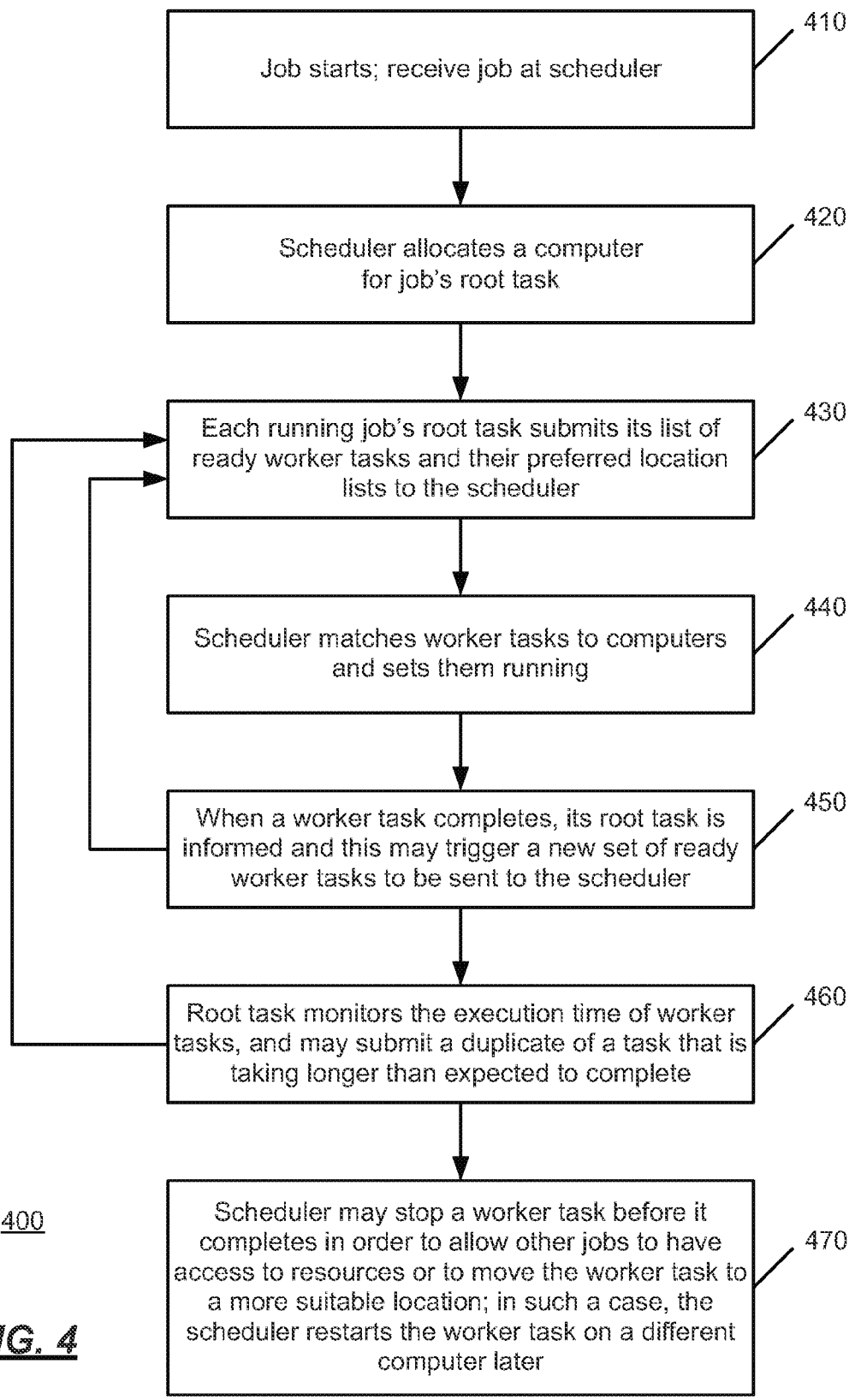
FIG. 4 is an operational flow of another implementation of a method of scheduling.

FIG. 4 is an operational flow of another implementation of a method 400 of scheduling with respect to a computer cluster that is used to execute distributed jobs. In an implementation, a job starts, with its tasks running on one or more compute nodes, such as the compute nodes 110, 115, 120. Each job initially starts a "root task" that contains a state machine managing the workflow of that job. The computation for the job is executed by "worker tasks" which are individual processes that may run on any computer. A worker task may be executed multiple times, for example to recreate data lost as a result of a failed computer, and will generate the same result. In an implementation, a job's workflow may be represented by a directed acyclic graph of worker tasks where edges represent dependencies, and the root task monitors which worker tasks have completed and which are ready for execution. While running, tasks are independent of each other, so killing one task will not impact another.

A scheduler may act as a centralized scheduling service for the computer cluster and may maintain a batch queue of jobs (e.g., in storage 180 or storage 360). At any given time, there may be several concurrent jobs sharing the resources of the computer cluster and others queued waiting for admission. At 410, a job may start (e.g., begin execution or start running) and may be received at a scheduler, such as the scheduler 160 or 300. The scheduler may allocate a computer (e.g., one of the compute nodes 110, 115, 120) for the root task of the job, at 420. If that computer fails, the job may be re-executed from the start. Operations 410 and 420 may repeat as additional jobs start and are received at the scheduler.

At 430, each running job's root task may submit information (e.g., identification, a list, etc.) to the scheduler regarding worker tasks that are ready for execution along with information regarding locations (e.g., compute nodes) that the worker tasks may execute on. The information regarding locations may comprise preferred locations for one or more of the worker tasks. At 440, the scheduler may match worker tasks to computers (e.g., using network flow graph and min-cost flow techniques such as those described further herein) and the tasks may begin running on the assigned computers.

When a worker task completes, at 450, its root task may be informed (e.g., by the worker task). Such a completion may trigger sending information pertaining to one or more worker tasks that are ready for execution to the scheduler. Processing may continue at 430 with the scheduler assigning those worker tasks to computers (e.g., using network flow graph and min-cost flow techniques).

A root task may monitor the execution time of one or more of its worker tasks, at 460. If a worker task is taking longer than expected to complete (e.g., longer than a predetermined amount of time), the root task may submit a duplicate of the worker task to the scheduler (e.g., at 430).

At some point, e.g., pursuant to an assignment of tasks to computers determined at 430 and 440, the scheduler may stop or kill a worker task before it completes, at 470. Such an operation may be performed to allow other jobs to have access to resources or to move the worker task to another (e.g., a more suitable) location to execute. In such a case, the scheduler may restart the worker task on a different computer at a later time. In an implementation, when a worker task fails because of unreliable computer cluster resources, its root task may backtrack through the dependency graph and re-submit the tasks to regenerate any intermediate data that has been lost.

In an implementation, the scheduler is not given any estimates of how long worker tasks will take, what resources they will consume, or given information regarding the upcoming worker tasks that will be submitted by jobs once running tasks complete. Because there is no resource-consumption information available, in an implementation, it may be ensured that each computer can have at most one running task at any time. Alternatively, in some implementations, the scheduler may be given estimates of how long worker tasks will take, the resources they will consume, and/or information regarding the upcoming worker tasks that will be submitted by jobs once running tasks complete. In such implementations, the scheduler may use the estimates and information in the assigning and/or scheduling of jobs.

Figure 5:
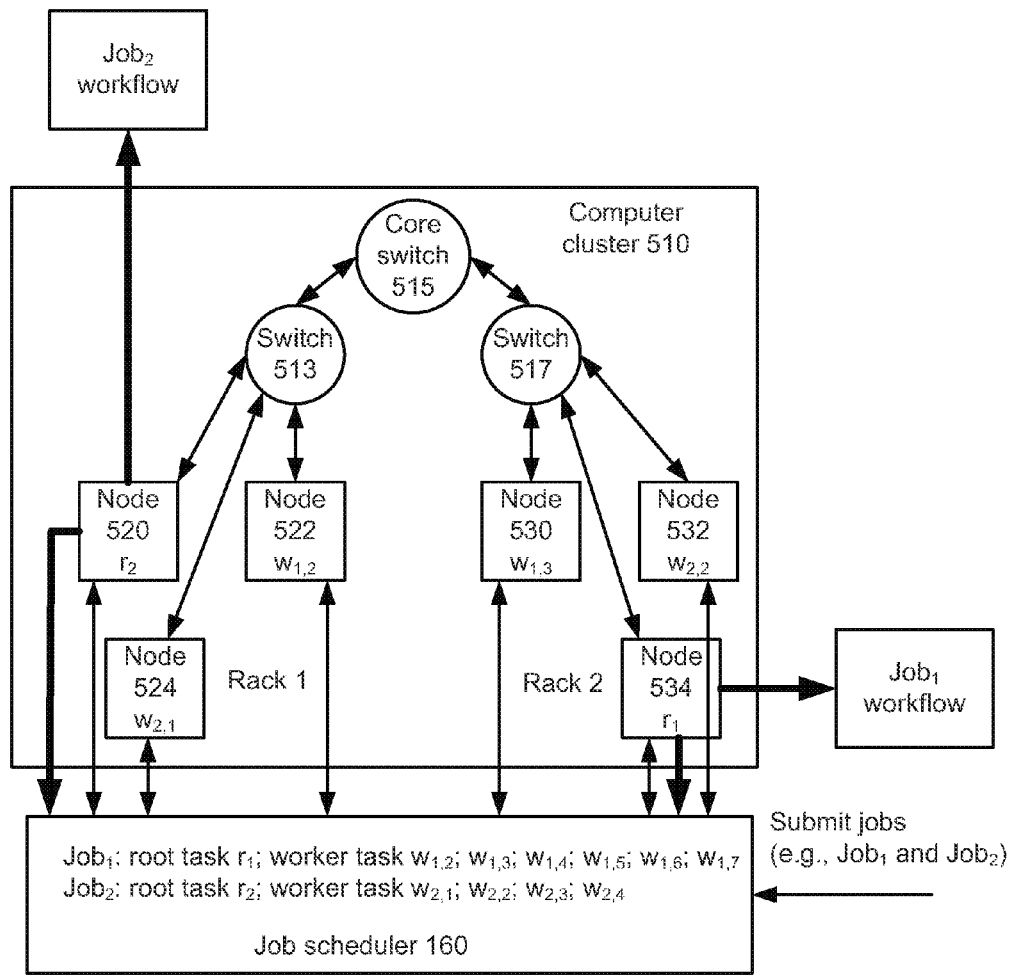
FIG. 5 illustrates an example cluster scheduling system.

FIG. 5 illustrates an example cluster scheduling system 500 that comprises a job scheduler 160 and a computer cluster 510. Aspects of the job scheduler 160 are described with respect to FIG. 1, for example. In an implementation, the computer cluster 510 is homogeneous and is provided under a single administrative domain. The computer cluster 510 may comprise racks (e.g., rack 1 and rack 2) of computers (also may be referred to as nodes or compute nodes). There is a hierarchical network in which each rack contains a local switch (i.e., a rack switch) and the rack switches are interconnected via a single core switch, so communication between computers in the same rack is "cheaper" (e.g., faster, more efficient, less processor utilization, etc.) than communication between racks. As shown in the system 500, rack 1 comprises nodes 520, 522, 524 and local or rack switch 513, and rack 2 comprises nodes 530, 532, 534 and local or rack switch 517. The rack switches 513 and 517 are interconnected via a core switch 515.

More particularly, FIG. 5 shows a computer cluster 510 with six computers (e.g., nodes 520, 522, 524, 530, 532, 534) organized into two racks (rack 1 and rack 2). Each rack contains a switch (switches 513 and 517) that communicates with a core switch 515. The nodes, racks, and switches shown and described with respect to FIG. 5 are for example purposes only, and any number and/or configuration of nodes, racks, and switches may be used. Each running job j starts a root task $r_j$ that submits worker tasks to the scheduler 160 according to a job-specific workflow. The scheduler 160 determines which tasks should be active at any given time, matches them to available nodes, and sets them running.

As described further herein, jobs may be submitted to the job scheduler 160, which assigns the tasks of the jobs to the nodes of the computer cluster 510 for execution. A worker task may read data from storage attached to the nodes in the computer cluster 510. This data may be inputs to the job stored as (possibly replicated) partitioned files in a distributed file system or intermediate output files generated by upstream worker tasks. In an implementation, a worker is not submitted to the job scheduler 160 until all of its input files have been written to the computer cluster 510, at which time their sizes and locations are known. When the nth worker in job j, denoted $w_n^j$, is ready, its root task $r_j$ determines for each computer m the amount of data that $w_n^j$ would have to read across the network if it were executed on computer m.

The root task $r_j$ may generate two lists for task $w_n^j$: a first list of preferred computers (e.g., nodes) and a second list of preferred racks. In an implementation, any computer that stores more than a fraction $\delta^C$ of $w_n$'s total input data is added to the first list, and any rack whose computers between them store more than a fraction $\delta^r$ of $w_n$'s total input data is added to the second list. In an implementation, a value of 0.1 may be used for both $\delta^C$ and $\delta^r$. These settings ensure that each list has at most a certain number of entries (e.g., five entries, ten entries, fifteen entries, etc.), and avoids marking every computer in the cluster as "preferred" when a task reads a large number of approximately equal-sized inputs, for example when a dataset is being re-partitioned.

The cost of running worker task $w_n^j$ in a particular location may be estimated by the scheduler 160 as a function of the number of bytes of input this placement would cause this worker task to read across the local rack switch (e.g., switch 513 or switch 517) and the core switch 515. The costs may be approximated using the following:

(1) $(R^X(w_n^j), X^X(w_n^j))$ gives an upper bound for the number of bytes of input that $w_n^j$ read across the rack switch and the core switch 515, respectively. These values will result if $w_n^j$ is placed on the worst possible computer in the cluster with respect to its inputs;

(2) $(R_I^R(w_n^j), X_I^R(w_n^j))$ gives an upper bound for the number of bytes of input that $w_n^j$ will read across the rack switch and the core switch 515, respectively, if the worker task is executed on a computer in rack I. These numbers may be determined and sent to the scheduler 160 for every rack in a preferred list of racks of computers. For other racks, the numbers may be approximated using $(X^X(w_n^j)/K, X^X(w_n^j))$ where K is the number of racks in the cluster; and (3) $(R_m^C(w_n^j), X_m^C(w_n^j))$ gives the number of bytes of input that $w_n^j$ will read across the rack switch and the core switch 515, respectively, if the worker task is executed on computer m. If computer m is a preferred computer, these numbers are determined and sent to the scheduler 160; otherwise, they may be approximated using $(R_I^R(w_n^j), X_I^R(w_n^j))$ where I is computer m's rack.

Figure 6:
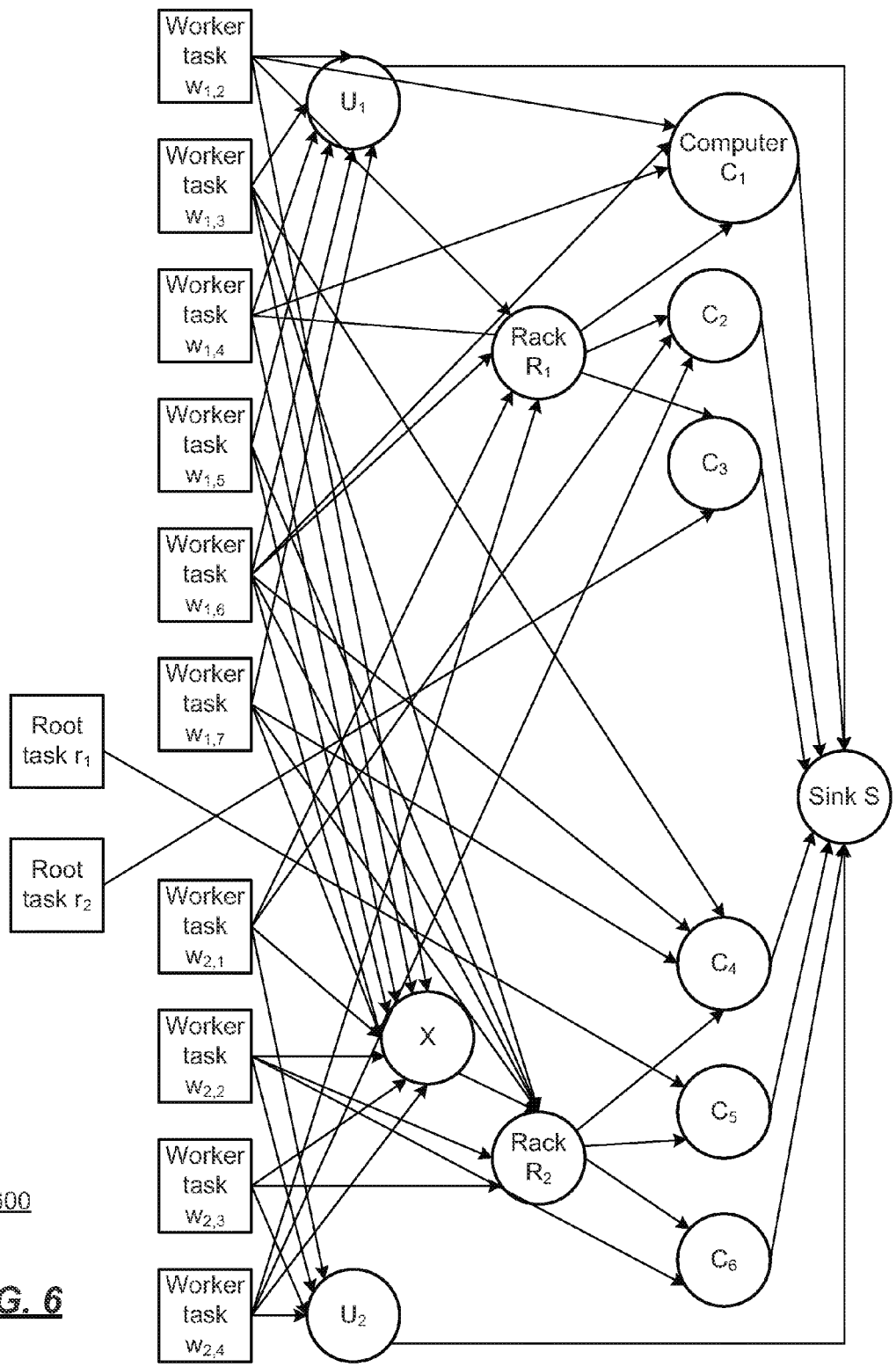
FIG. 6 is a diagram of an example flow based scheduler graph.

FIG. 6 is a diagram of an example flow based scheduler graph 600 for the example computer cluster 510 of FIG. 5 along with its tasks and jobs. The example graph 600 is thus for a computer cluster with L=2 racks and M=6 computers on which J=2 jobs are currently executing. It is noted that the tasks and jobs shown and described with respect to FIGS. 5 and 6 are for example purposes only, and any number and/or types of tasks and jobs may be used. Additionally, the mapping may be trivially extended to a network with more than two levels in its hierarchy, and may be extended in other ways beyond network hierarchy, such as to put a hierarchy on quotas for groups of users by adding additional nodes, for example.

As shown, two jobs are running with root tasks on computers 3 and 5. Each root task has a single outgoing edge to the computer where it is currently running (e.g., root task $r_1$ has an edge to computer $C_5$ and root task $r_2$ has an edge to computer $C_3$). Worker tasks are submitted to the scheduler 160 by the root tasks, annotated with a list of preferred computers and a list of preferred racks. Each worker task in job j has an edge to j's unscheduled node $U_j$, to a cluster aggregator node X, and to every rack and computer in its preference lists. Workers that are currently executing also have an edge to the computer on which they are running. Graph edges may have costs and capacities that are not shown in FIG. 6.

In an implementation, at least some of the edges encode data locality, e.g., the edges from vertices representing worker tasks to vertices representing individual compute nodes and racks. Other edges may represent fixed location of tasks (such as the ones from root tasks to the individual machines they are running on) or alternative possibilities for task location assignment (e.g., ones from worker tasks to the unscheduled node, from worker tasks to the cluster-aggregator node, etc.). The edges encoding data locality may be instances of edges that encode (weighted) affinities between worker tasks and locations (e.g., individual compute nodes, racks of compute nodes, etc.). In an implementation, edges may encode other affinities, such as to nodes having particular resources that assist and/or accelerate a task's computation (e.g., particular data caches, computation units such as GPUs, etc.).

An implementation of the structure of a network flow graph and the costs and capacities that allow for mapping a min-cost feasible flow to a fair scheduling assignment is described. The flow based scheduler graph 600 corresponds to an instantaneous snapshot of a computer cluster, such as the computer cluster 510, encoding the set of the worker tasks that are ready to run and their preferred locations, as well as the running locations and current wait times and execution times of the currently executing worker tasks and root tasks.

The overall structure of the graph 600 can be interpreted as follows. A flow of one unit along an edge in the graph 600 can be thought of as a "token" that corresponds to the scheduling assignment of one task. Each submitted worker task w or root task r receives one unit of excess flow. The sink node or sink S is the only place to drain off the excess flow that enters the graph 600 through the submitted tasks, so for a feasible flow each task finds a path for its flow to reach the sink S. The paths from a task in job j to the sink S lead either through a computer C or through a node $U_j$ that corresponds to leaving the task unscheduled. Each computer C has unit capacity, so if there are more tasks than computers some tasks will be unscheduled. By controlling the capacities between $U_j$ and the sink S, fairness may be controlled by setting the maximum and minimum number of tasks that a job may leave unscheduled, and hence the maximum and minimum number of computers that can be allocated for running tasks.

In an implementation, a min-cost flow technique may perform a global search for the instantaneous optimal scheduling solution (with respect to the costs that have been assigned) subject to predetermined fairness constraints. The scheduler 160 may update the graph 600 whenever a salient event occurs (e.g., a worker task completes, a new task is submitted, etc.), and on a regular timer event since some costs may be time-dependent. Whenever the graph 600 is updated, the scheduler 160 may compute a new min-cost flow and may then start or kill tasks to reflect the matching induced by the flow. Because the scheduling solution may be invoked at any point in time, it can be used in conjunction with other scheduling techniques (e.g., techniques that are implemented or run at those points in time when the min-flow scheduling solution is not being invoked).

More particularly, with regard to costs and capacities, in an implementation, rack I contains $K_I$ computers with $\Sigma_I K_I = M$. Each job j has submitted $N_j$ worker tasks where $\Sigma_j N_j = N$. Job j has an allocation specified by $A_j$ and $B_j$ where $1 \leq B_j \leq A_j \leq N_j$. $A_j$ is the maximum number of worker tasks that the job is currently allowed to have running and $B_j$ is the minimum number of running workers that job j is assigned. These allocation parameters may be set as described further below.

The nodes in the graph may be divided into sets, each represented by a column in FIG. 6, and directed edges point from left to right in FIG. 6. The number of nodes in the graph 600 is 2J+N+L+M+2, and the number of edges is 2J+L+2M+N. The node sets are described as follows.

With respect to a root task set, each job j has a node $r_j$ with excess 1 corresponding to its root task. $r_j$ has a single outgoing edge with capacity 1 and cost 0. If the root task has already been assigned to a computer m, the outgoing edge goes to that computer's node $C_m$ and the scheduler 160 leaves the root task running on that computer m. Otherwise, the outgoing edge is connected to the cluster aggregator node X, in which case the task is set running on a computer chosen according to the global min-cost criterion. There will be a flow of 1 through $r_j$.

With respect to a worker task set, each submitted worker task from job j has a corresponding node $w_n^j$ with excess 1. $w_n^j$ has multiple outgoing edges each of capacity 1, corresponding to the potential scheduling decisions for this worker task: (1) Unscheduled: there is an edge to the job-wide unscheduled node $U_j$ with a cost $v_n^j$ that is the penalty for leaving $w_n^j$ unscheduled. If this edge gets flow 1, then the worker task is not scheduled anywhere; (2) Any Computer: there is an edge to the cluster aggregator node X with a cost an that is the upper bound of $w_n^j$'s data cost on any computer. If this edge gets flow 1, then the worker task will be newly scheduled to a computer that could be anywhere in the cluster; (3) Within Rack: there is an edge to the rack node $R_I$ with a cost $\rho_{n,I}^j$ for each rack I on $w_n^j$'s preferred rack list, where $\rho_{n,I}^j$ is the upper bound of $w_n^j$'s data cost on any computer in I. If one of these edges gets flow 1, then the worker task will be newly scheduled to a computer that could be anywhere in the corresponding rack; and (4) Computer: there is an edge to the compute node $C_m$ for each computer m that is on $w_n^j$'s preferred computer list with a cost $\gamma_{n,m}^j$ that is the cost of running $w_n^j$ on computer m. If the worker task is currently running on a computer m' that is not in its preferred list, there is also an edge to computer m'. If one of these edges gets flow 1, then the worker task will be scheduled to run on the corresponding computer.

In an implementation, there is a flow of 1 through $w_n^j$. The values assigned to costs $v_n^j$, $\alpha_n^j$, $\rho_n^j$, and $\gamma_n^j$ are described below.

With respect to a job-wide unscheduled set, each job j has an unscheduled aggregator node $U_j$ with excess $A_j - N_j$ and incoming edges from every worker task in job j. It has an outgoing edge to the sink S with capacity $A_j - B_j$ and cost 0. These settings for excess and capacity ensure that the flow f through $U_j$ will satisfy $A_j - N_j \leq f \leq A_j - B_j$. Thus, the number σ of scheduled worker tasks for j satisfies $B_j \leq \sigma \leq A_j$ since each of the $N_j$ workers $w_n^j$ sends its flow somewhere. Therefore, $U_j$ enforces the fairness allocation for job j.

Regarding a cluster aggregator, in an implementation, there is a single cluster wide aggregator node X with excess 0. This has an incoming edge of capacity 1 from every worker task that has been submitted by any job and every root task that has not yet been scheduled. It has an outgoing edge to each rack node $R_I$ with capacity $K_I$ and cost 0. X will get a flow between 0 and M.

With respect to a rack aggregator set, each rack I has an aggregator node $R_I$ with excess 0. $R_I$ has incoming edges from the cluster wide aggregator X and each worker task with I on its preferred rack list. $R_I$ has an outgoing edge with capacity 1 and cost 0 to the compute node $C_m$ for every computer m that is in its rack. $R_I$ will get a flow between 0 and $K_I$.

With respect to a computer set, each computer m has a node $C_m$ with excess 0. $C_m$ has incoming edges from its rack aggregator $R_I$ and each worker task with computer m on its preferred list as well as any worker task that is currently running on computer m. $C_m$ has an outgoing edge with capacity 1 to the sink S. The flow through $C_m$ is 1 if there is a task running on m and 0 otherwise.

Regarding a sink, there is a single sink node (sink S) with excess $\epsilon_0 = \Sigma_j(A_j+1)$. This excess balances the excess flow entering the graph 600 at each worker task and root task along with the excess $A_j - N_j$ introduced at each job-wide unscheduled node $U_j$ to enforce the minimum flow constraint through U. The flow through sink S equals $\Sigma_j(N_j+1)$.

Once the scheduler 160 has output a min-cost flow solution (e.g., using the min-cost flow generator 330, for example), a scheduling assignment can be read from the graph 600 by finding, for each computer m, the incoming edge (if any) that has unit flow. If this edge leads from a task, the assignment is known. If the incoming edge leads from a rack aggregation node, then one of the tasks that sent flow to that node may be selected arbitrarily to run on computer m. In an implementation, a flow decomposition may be used to determine such an assignment.

With respect to min-cost flow, the costs $v_n^j$, $\alpha_n^j$, $\rho_n^j$, and $\gamma_n^j$ may be determined on the outgoing edges from each $w_n^j$, and the allocations $A_j$ and $B_j$ may also be determined. The cost $v_n^j$ between worker $w_n^j$ and $U_j$ can be used to set priorities for worker tasks to break ties and determine a preference for scheduling one worker task over another worker task when their other costs are approximately equal. In an implementation, this cost may be set proportional to the time that the task has been waiting. So $v_n^j = \omega v_n^j$, where ω is a wait time cost factor and $v_n^j$ is the total number of seconds that $w_n^j$ has spent unscheduled since it was submitted. In an implementation, this may be summed over several timespans if $w_n^j$ was started and then killed one or more times.

$\alpha_n^j$, the cost of scheduling $w_n^j$ on an arbitrary cluster computer, may be set to $(\psi R^X(w_n^j) + \xi X^X(w_n^j))$, where ψ is the cost to transfer one GB across a rack switch (e.g., the switch 513 or 517), ξ is the cost to transfer one GB across the core switch (e.g., the switch 515), and $R^X(w_n^j)$ and $X^X(w_n^j)$ are data sizes as defined above. The cost $\rho_{n,I}^j$ of running $w_n^j$ on an arbitrary computer in rack I is set to $(\psi R_I^R(w_n^j) + \xi X_I^R(w_n^j))$, and the cost $\gamma_{n,m}^j$ of starting $w_n^j$ on a preferred computer m is set to $(\psi R_m^C(w_n^j) + \xi X_m^C(w_n^j))$.

If $w_n^j$ is already running on computer m', then its cost has two terms: a data term $d^* = (\psi R_m^C(w_n^j) + \xi X_m^C(w_n^j))$ and a preemption term $p^*$. $p^*$ is set to $\theta_n^j$, the total number of seconds that $w_n^j$ has spent running on any computer since it was submitted. This may be summed over several timespans if $w_n^j$ was started and then killed one or more times.

The term $p^*$ represents the amount of work already invested in $w_n^j$. $\gamma_{n,m}^j$, the cost to keep $w_n^j$ running on computer m', is set to $d^* - p^*$, and therefore leaving $w_n^j$ running becomes increasingly appealing as time goes on. $\theta_n^j$ is set to the total running time of $w_n^j$ rather than its current running time in order to guarantee starvation-freedom as described below.

In an implementation, the min-cost flow may be computed incrementally because the graph and the costs may change very little between computations. Thus, an incremental computation can be used to efficiently update the min-cost flow.

The allocation $(A_j, B_j)$ for each job may control the fairness regime. Regimes may include fair sharing with preemption, fair sharing without preemption, unfair sharing with preemption, and unfair sharing without preemption.

Regarding fair sharing with preemption, each job may be given an instantaneous allocation corresponding to the number of computers it is currently allowed to muse. Job j gets a baseline allocation of $A_j^* = (\lfloor M/K \rfloor, |w_n^j|)$, where the cluster contains M computers, there are K running jobs, and $|w_n^j|$ is the number of workers that j currently has either running or in queues at the scheduler. If $\Sigma_j A_j^* < M$, the remaining slots are divided equally among jobs that have additional ready worker tasks, to give final allocations $A_j$ where $\Sigma_j A_j = \min(M, \Sigma_j |w_n^j|)$. As jobs start and complete, and new worker tasks are submitted or stop running, the allocation for a given job will fluctuate. This fair sharing allocation procedure may be replaced by a different technique that takes into account job priorities, quotas for groups of users, etc.

Fair shares $A_j$ may be computed as described above, and $B_j = A_j$ so job j is constrained to use its share of the cluster computers. Tasks may be killed at any time in pursuit of a lower cost flow solution, so a running task may be killed even if its job's allocation does not decrease, in which case another task from that job may be started to maintain its allocation.

Regarding fair sharing without preemption, fair shares may be computed as above but if a job is already running more than its fair share of workers, its allocation may be increased to that total and the allocations for other jobs are proportionally decreased. In addition, the capacities of all edges to all nodes except the current running computer may be set to zero for running tasks, so preempting any running worker is prevented.

Regarding unfair sharing with preemption, each job j is allowed as many computers as needed to minimize the overall cost of the scheduling assignments, so $B_j=1$ and $A_j=N_j$. However, if $N \leq M$, $B_j$ is set equal to $A_j$ and equal to $N_j$ to reduce the chance of idle computers when there are waiting tasks. A computer may be left idle, for example if a waiting task $w_n^j$ has a strong data locality preference for a computer that is currently occupied but the wait time cost $v_n^j$ has not yet overcome the cost of scheduling the task in a suboptimal location. Regarding unfair sharing without preemption, allocations are set as for unfair sharing with preemption, but capacities are adjusted as for fair sharing without preemption to prevent the preemption of any running jobs. Note that selecting between policies may be achieved by changing a single graph weight and a set of edge capacities.

The parameters that determine behavior include $\omega$ which sets the cost of waiting in the queue, and $\xi$ and $\psi$ which determine the cost of transferring data across the core switch and a rack switch, respectively. Setting higher data costs causes the system to optimize more aggressively for data locality, preempting and restarting tasks when more suitable computers become available. Setting data costs that are appropriate to network capacity has a substantial performance benefit. In an implementation, $\omega$ may be set to 0.5, the cost $\psi$ of transferring 1 GB across a rack switch may be set to 1, and the cost $\xi$ of transferring 1 GB across the core switch may be set to 2.

In an implementation, starvation-freedom is a constraint. Starvation refers to when a task never completes because other tasks always have a higher priority. With starvation-freedom, every job will eventually make progress, even though at any time some of its tasks may be preempted to make way for other workers. Since a worker task may be preempted at any time, even when a job has not exceeded its allocation of computers, it may be ensured that a job's tasks will eventually complete so the job can make progress. In order to achieve this guarantee, a large maximum value $\Omega$ may be set for the data costs and wait time costs of tasks that are not currently running. Once $\theta_n^j$ for a task running on computer m gets large enough, $\gamma_{n,m}^j < -\Omega$ and therefore the cost of evicting $w_n^j$ will be larger than the benefit of moving any other task to run on m. It can be shown that as long as job j does not keep submitting new worker tasks, and $B_j \geq 1$ so job j always has at least one running task, eventually $\gamma_{n,m}^j < -\Omega$ for all of job j's running tasks and the tasks will run to completion.

The cost of leaving a task running where it is monotonically decreases over time and if $\omega=0$ or there are no tasks currently unscheduled, then the other costs in the graph are constant. If a min-cost flow solution is modified by decreasing the cost of edges that are already at full capacity, the flow assignment remains a min-cost solution. Thus, when there are no unscheduled tasks, the system is guaranteed not to change any scheduling assignment until a task completes or a new task is submitted.

In an implementation, the assignment of multiple tasks to a single computer may be supported by increasing the capacity of the edge from each computer to the sink. It may also be advantageous to temporarily assign more tasks to a computer than its capacity allows, and time-slice the tasks, instead of preempting a task that has been running on the computer for a long time.

In an implementation, better cluster utilization may be achieved in some cases by adaptively setting the job concurrency K, for example opportunistically starting "spare" jobs if cluster computers become idle, but reducing their worker task allocation to zero if resource contention returns.

Although embodiments have been described with respect to scheduling jobs of a computing cluster, it is contemplated that any type of scheduling problem may be encoded using min-cost flow using the techniques described herein. Additionally, in many scheduling settings, tasks consume less than 100% of a computer's resources. The resource requirements of the task may be modeled as a multi-dimensional quantity, for example the amount of CPU, disk IO, and memory that the task demands.

Although embodiments have been described with respect to clusters where the data is stored on the compute nodes, the scheduling techniques described herein may also be applied to systems where some or all of the data is stored elsewhere, such as on dedicated non-compute nodes or storage nodes within the cluster or outside of the cluster, for example. In an implementation, a data transfer cost may be assigned that would result from executing a worker on any given compute node. This is possible even if the data is not located on any of the compute nodes, as long as there are some compute nodes for which the cost will be lower than others.

Figure 7:
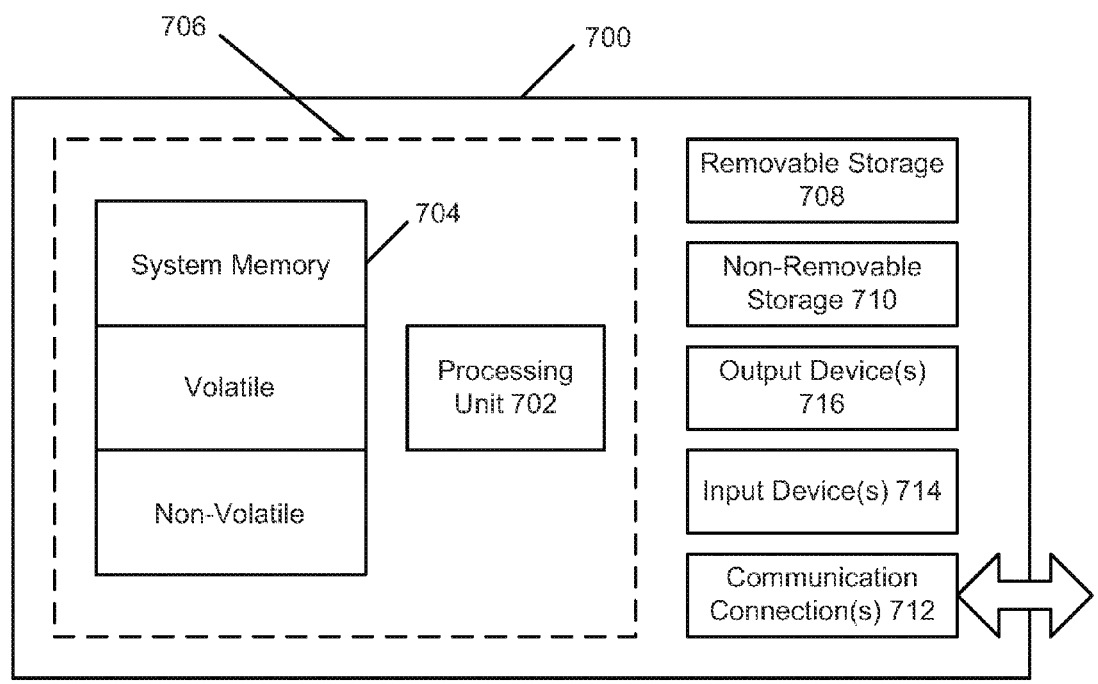
FIG. 7 is a block diagram of an example computing environment in which example embodiments and aspects may be implemented.

FIG. 7 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 700. Computing device 700 depicts the components of a basic computer system providing the execution platform for certain software-based functionality in accordance with various embodiments. Computing device 700 can be an environment upon which a compute node, computer cluster, and/or job scheduler from various embodiments is instantiated. Computing device 700 can include, for example, a desktop computer system, laptop computer system or server computer system. Similarly, computing device 700 can be implemented as a handheld device (e.g., cellphone, etc.) Computing device 700 typically includes at least some form of computer readable media. Computer readable media can be a number of different types of available media that can be accessed by computing device 700 and can include, but is not limited to, computer storage media.

In its most basic configuration, computing device 700 typically includes at least one processing unit 702 and memory 704. Depending on the exact configuration and type of computing device, memory 704 may be volatile (such as random access memory (RAM)), non-volatile (such as read-only memory (ROM), flash memory, etc.), or some combination of the two. This most basic configuration is illustrated in FIG. 7 by dashed line 706.

Computing device 700 may have additional features/functionality. For example, computing device 700 may include additional storage (removable and/or non-removable) including, but not limited to, magnetic or optical disks or tape. Such additional storage is illustrated in FIG. 7 by removable storage 708 and non-removable storage 710.

Computing device 700 typically includes a variety of computer readable media. Computer readable media can be any available media that can be accessed by device 700 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 704, removable storage 708, and non-removable storage 710 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700.

Computing device 700 may contain communications connection(s) 712 that allow the device to communicate with other devices. Computing device 700 may also have input device(s) 714 such as a keyboard, mouse, pen, voice input device, touch input device, etc. Output device(s) 716 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A flow based scheduling method, comprising:
   receiving a job of a plurality of jobs at a scheduler, each job of the plurality of jobs comprising a root task and a plurality of worker tasks;
   allocating, by the scheduler, a computer in a computer cluster for execution of each of the root tasks of the plurality of jobs, the computer cluster comprising a plurality of computers;
   receiving information, at the scheduler from the root task, regarding the worker tasks and locations of execution of the worker tasks, wherein the received information comprises a list of ready worker tasks of the plurality of worker tasks, and, for each ready worker task, affinities between the ready worker task and the computers of the plurality of computers for execution;
   determining, by the scheduler based on the received information, which one of the plurality of computers each of the ready worker tasks is to execute on by generating a network flow graph using the root tasks and the ready worker tasks, wherein the network flow graph comprises a plurality of edges, wherein at least some of the edges encode the affinities between the ready workers tasks and the plurality of computers in the computer cluster;
   determining a solution to the network flow graph;
   determining an assignment of the ready worker tasks to the computers using the solution to the network flow graph; and
   executing each of the ready worker tasks based on the assignment on an assigned computer of the plurality of computers.

2. The method of claim 1, wherein determining the solution to the network flow graph comprises determining a min-cost flow solution to the network flow graph.

3. The method of claim 1, further comprising:
   receiving at the scheduler updated information pertaining to the ready worker tasks;
   revising the network flow graph using the updated information;
   determining a solution to the revised network flow graph; and
   determining a new assignment of the ready worker tasks to the computers comprised within the computer cluster.

4. The method of claim 1, further comprising:
   receiving information at the scheduler that one of the ready worker tasks has completed;
   receiving information from the root task at the scheduler regarding an additional ready worker task;
   determining, based on the information from the root task at the scheduler regarding the additional ready worker task, which one of the plurality of computers the additional ready worker task is to execute on; and
   executing the additional ready worker task on the determined computer.

5. The method of claim 1, further comprising:
   receiving information from the root task at the scheduler regarding an additional ready worker task;

determining, based on the information from the root task at the scheduler regarding the additional ready worker task, which one of the plurality of computers the additional ready worker task is to execute on;

executing the additional ready worker task on the determined computer;

stopping, by the scheduler, one of the ready worker tasks from executing after the ready worker task has begun executing on the associated determined computer, the stopping being performed pursuant to determining which one of the plurality of computers the additional ready worker task is to execute on; and restarting the ready worker task that was stopped on one of the plurality of computers at the same time or at a later time.

6. A flow based scheduling system, comprising:

a computer cluster comprising a plurality of compute nodes;

a plurality of root tasks, each root task in communication with at least one of the compute nodes; and a job scheduler, in communication with the root tasks, that:
receives information pertaining to a plurality of tasks from at least one of the root tasks, wherein the received information comprises a list of ready tasks of the plurality of tasks, and, for each ready task, affinities between the ready task and the compute nodes of the plurality of compute nodes for execution;
generates a network flow graph using the ready tasks; and
determines a solution to the network flow graph and an assignment of the ready tasks to at least one of the compute nodes based on the solution, and sends instructions based on the assignment to the at least one root task identifying a ready task of the plurality of tasks to run and a compute node of the plurality compute nodes that is to run the identified ready task, wherein the network flow graph comprises a plurality of edges, wherein at least some of the edges encode the affinities between the ready tasks and the plurality of compute nodes within the computer cluster.

7. The system of claim 6, wherein the plurality of tasks further comprise waiting tasks.

8. The system of claim 6, wherein the job scheduler determines the solution to the network flow graph using a min-cost flow solution to the network flow graph.

9. The system of claim 6, wherein the job scheduler further receives from the root tasks updated information pertaining to the plurality of tasks, revises the network flow graph using the updated information, determines a solution to the revised network flow graph, and determines a new assignment of the ready tasks to the compute nodes comprised within the computer cluster.

10. The system of claim 6, wherein the network flow graph further comprises a plurality of capacities, wherein at least some of the edges encode data locality and the capacities provide constraints that ensure fairness.

* * * * *